United States Patent [19]

Dujardin et al.

[11] 4,065,310

[45] Dec. 27, 1977

[54] FIXING AND RETRIEVING RECORDED INFORMATION PRODUCED BY MEANS OF PHOTOSENSITIVE MATERIAL OF BIOLOGICAL ORIGIN

[76] Inventors: Esther Dujardin, 8, Avenue des Bois, 4050 Mery-Esneux, Belgium; Ysbrand Kuiper, Grammerode 21, St. Truiden, Belgium, B 3800; Rene Cremer, 2, Ave. des Tilleuls, Liege, Belgium, B 4000; Cyrille Sironval, 8, Avenue des Bois, Mery-Esneux, Belgium, B 4050

[21] Appl. No.: 627,344

[22] Filed: Oct. 30, 1975

Related U.S. Application Data

[63] Continuation-in-part of Ser. No. 326,185, Jan. 24, 1973, Pat. No. 3,923,516.

[30] Foreign Application Priority Data

Jan. 25, 1972 United Kingdom ................. 3498/72

[51] Int. Cl.² ........................... G03C 5/04; G03C 5/24

[52] U.S. Cl. .................................. 96/27 R; 96/48 R; 96/88; 260/6; 260/8; 260/112 R; 106/124; 106/157

[58] Field of Search ....................... 96/48 R, 27 R, 88; 340/173; 260/112, 6, 8; 106/157, 124

[56] References Cited

PUBLICATIONS

Smith, et al.: Nature, 178 (1956), 751-752.

*Primary Examiner*—Won H. Louie, Jr.
*Attorney, Agent, or Firm*—Montague & Ross

[57] ABSTRACT

A method of recording and reproducing information using a photographic recording material which comprises a support bearing at least one photosensitive layer containing photoactive protochlorophyll(ide)-apoprotein complex. The layer is exposed to light of the wavelength region absorbed by the complex in a pattern representing information to be recorded and forms a corresponding pattern of differentiations in light-absorption and fluorescence-emission characteristics. The latter can be scanned to reproduce the information.

8 Claims, 2 Drawing Figures

FIXING AND RETRIEVING RECORDED INFORMATION PRODUCED BY MEANS OF PHOTOSENSITIVE MATERIAL OF BIOLOGICAL ORIGIN

CROSS REFERENCE TO RELATED APPLICATIONS

This application is a continuation in part of application Ser. No. 326,185 filed Jan. 24, 1973 now U.S. Pat. No. 3,923,516 and is related to application Ser. No. 326,442 filed Jan. 24, 1973 (U.S. Pat. No. 3,871,888), and copending with Ser. No. 326,185.

FIELD OF THE INVENTION

The present invention relates to a method of recording and reproducing information wherein use is made of a photosensitive substance of biological origin. The photosensitive substance of biological origin is more particularly an apoprotein-protochlorophyll(ide) complex isolated from etiolated angiosperm plants.

BACKGROUND OF THE INVENTION

It is known that dark-grown (etiolated) plants undergo spectral changes under the influence of light. By brief illumination of the etiolated leaves the initial absorption maximum in the red region of the spectrum is irreversibly shifted from about 647 nm to about 676 nm and the initial low temperature fluorescence emission maximum in the red region of the spectrum is irreversibly shifted from about 657 nm to about 688 nm.

The protochlorophyll(ide) which has accumulated in the dark-grown plants and which is the direct precursor of the chlorophyll found in normal green chloroplasts is responsible for the above phenomenon by photoreduction of the protochlorophyll(ide) to chlorophyll(ide).

Essential for the photoreduction of the protochlorophyll(ide) to chlorophyll(ide) is a specific binding with an apoprotein. This binary complex of protochlorophyll(ide) with apoprotein has been termed protochlorophyll(ide) holochrome.

The isolated protochlorophyll(ide) holochrome extracted from the etiolated plants as described in the literature is unstable in the sense that it is photoactive only if it is kept in the dark at a temperature below 0° C., and the photoactivity is only retained for an appreciable length of time, say some weeks or months, if the holochrome is stored at a temperature appreciably below 0° C.

OBJECT OF THE INVENTION

It is the object of the invention to provide an improved method of recording (registering) and reproducing (retrieving) information of the invention.

The present invention is based upon the discovery that it is possible to render a protochlorophyll(ide) holochrome isolated from etiolated plants stable at room temperature or convert it to a form which remains photoactive at room-temperature, a photographic recording material utilizing the stabilized isolated holochrome as its photosensitive substance. The resulting recording medium is suitable for use in the recording of graphic and other information by information-wise exposure of the said material, i.e. exposure of the material to sensitizing light in a pattern representing information to be recorded.

Accordingly, the present invention provides a photographic recording material which, as broadly defined, comprises a support bearing at least one photosensitive layer containing photoactive protochlorophyll(ide)-apoprotein complex which, by information-wise exposure to light of the wavelength region absorbed by said complex, forms a pattern of information-wise differentiations in light-absorption and/or fluorescence emission.

The method of recording information involves information-wise exposure of a photosensitive protochlorophyll(ide)-apoprotein complex, to light of the wavelength region absorbed by said complex in a pattern representing the information to be recorded, so as to cause in the exposed areas a change in the absorption and fluorescence emission characteristics and produce a pattern of information-wise differentiations in light-absorption and fluorescence emission.

Therefore the photoactive protochlorophyll(ide)-apoprotein complex used as photoactive substance in accordance with the present invention is preferably such that it retains its photoactivity for substantial periods of time, e.g. at least some weeks and preferably at least some months, at room temperature.

As described in the aforementioned applications the maintenance of long-term photoactivity at room temperature is strictly dependant on the absence of free water in the protochlorophyll(ide)-apoprotein complex. The complex should therefore be substantially dehydrated, e.g. by lyophilization as described hereinafter.

A photoactive protochlorophyll(ide)-apoprotein complex which is particularly suitable for use as a photoactive ingredient in a photographic recording material in accordance with the invention can be obtained by extracting protochlorophyll(ide)-apoprotein complex from etiolated plant material and precipitating the complex with the help of a natural or synthetic polymeric material, e.g. polyethylene glycol, dextran, antibodies, etc., as described in the above-identified copending applications. The sole criterion for a suitable synthetic or natural polymeric material for the purposes of the invention is that it be capable of interacting with the apoprotein-holochrome complex to precipitate the latter without nullifying its sensitivity to light.

The resulting material can be described as a "ternary complex" of the isolated protochlorophyll(ide)-apoprotein binary complex with the natural or synthetic polymeric material, although it is not known whether the polymeric material actually forms a part of the complex or whether the polymeric material is merely in association with the binary complex.

Therefore the term "ternary" complex is used loosely and should be understood as referring to the photoactive product isolated from the etiolated plant material and chemically complexed with or only bonded by less than chemical bonds to (in association with) the natural or synthetic polymeric material.

Such a ternary complex remains photoactive when kept in the dark at temperature below 0° C., preferably below −10° C. but above these temperatures, owing to a denaturation of the protein, it gradually loses its photoactivity so that at a temperature of 23° C. it completely loses all photoactivity after a few days. Therefore, in order to ensure that the product will remain photoactive at room temperature and thus be suitable for use in the recording of information at room temperature, the formed complex should be dehydrated.

For a better understanding of the present invention, the absorption and fluorescence emission characteristics of the protochlorophyll(ide)apoprotein complex will now be described in detail.

The protochlorophyll(ide)-apoprotein complex isolated in photoactive condition from etiolated plants loses all photoactvity at temperatures below −100° C., e.g. at the temperature of liquid nitrogen (−196° C.), but regains its photoactivity when brought to normal temperatures again. The non-exposed complex has an absorption spectrum with a maximum in the U.V.-blue region of the spectrum (at about 436 nm) and a maximum in the red region of the spectrum, which slightly varies according to the circumstances of isolation and is between about 635 nm and 645 nm. The absorption band with maximum in the red region of the spectrum has a corresponding fluorescence emission maximum between about 645 and about 655 nm.

When the photoactive complex is completely photoconverted, the fluorescence emission band is shifted towards the longer wavelengths with a maximum at about 688 nm; the corresponding absorption band is also shifted towards the longer wavelengths. Moreover, by photoconversion the intensity of absorption is markedly reduced in the U.V. blue region (at 436 nm) and markedly increased in ther red region.

When before photoconversion, the complex is partly denaturated, the unexposed photoactive complex not only has a fluorescence emission maximum at about 645–655 nm owing to the remaining photoactive complex but also a fluorescence emission maximum at about 625–630 nm resulting from photo-inactive protochlorophyll(ide) apoprotein formed by denaturation. Thus with the initially photoactive complex, when denaturated before photoconversion, there is a shift from the fluorescence emission maximum at about 645–655 nm to a fluorescence emission maximum at about 625–630 nm. When the partly denaturated complex is exposed to effect complete photoconversion of the remaining photoactive complex, the exposed complex has a fluorescence emission band with a miximum at about 625–630 nm owing to the photo-inactive complex and a fluorescence emission band with a maximum at about 688 nm owing to the photoconverted complex.

By denaturating the photoexposed complex, the fluorescence emission band with maximum at about 688 nm of the photoconverted complex shifts to the shorter wavelengths to form a fluorescence emission band with maximum at about 670 nm.

The absorption bands corresponding to the above fluorescence emission bands are some 2 to 15 nm in the shorter wavelength region.

The above changes in absorption and fluorescence emission characteristics under the influence of light, of the protochlorophyll(ide)-apoprotein complex isolated in photoactive condition from etiolated plant material can be used for the recording and reproduction of information according to the present invention.

Information-wise exposure of the photosensitive complex should be carried out with light sources emitting light of the wavelength region absorbed by the complex. Since the complex has an absorption spectrum extending from the U.V.-blue region of the spectrum to the red region of the spectrum, exposure may be effected by means of light sources of the polychromatic type e.g. ordinary daylight, xenon gas lamps, incandescent bulbs, photographic flash units and the like, or by light sources of the monochromatic type, e.g. monochromatic U.V.-blue light and monochromatic red light including lasers.

The information-wise exposure of the present invention may be a contact exposure as well as an optical-projection exposure as is used e.g. in an optical enlarging apparatus. The information-wise exposure need not be simultaneous in all parts of the complex. The exposure may be progressive in a continuous step as in sound track recording or in successive intermittent steps provided that the required information-wise change is obtained. Thus, the complex may be scanned with an image-wise modulated radiant energy spot of high intensity e.g. a laser beam, or the complex may be progressively exposed through a slit e.g. exposed to copying light of a tubular lamp that is given a translation movement along the original or master carrying the information to be recorded.

The information to be recorded may be of any desirable type e.g. information in the form of images, codemarks, dots and lines, alphanumerical writing, etc.

The recorded information can be retrieved, i.e. reproduced, as described hereinafter provided the recorded information is fixed.

Fixing may occur in various ways, e.g. by selective removal of the exposed or non-exposed complex, by selective removal of the pigment of the exposed or non-exposed complex, or by such physical or chemical treatment that the photoconversion of non-exposed complex is inhibited temporarily or permanently.

A very convenient way of permanently fixing the information-wise exposed complex is to denaturate the protein-material in the complex, e.g. by a heat treatment, by humidification, by an acid-treatment with acids in solution or vapor form. Reversible fixing of the recorded information, which means that the unexposed complex is temporarily rendered insensitive to actinic light exposure, can be suitably effected by submitting the exposed material to such low temperature that it is no longer photosensitive, say below −100° C., e.g. the temperature of liquid nitrogen (−196° C.).

The temporary fixing of the recorded information offers the possibility of recording supplemental information. For instance, after information-wise exposure, the complex is kept at very low temperature, e.g. that of liquid nitrogen, so that the recorded information can be retrieved at this temperature. Then the complex can be further exposed information-wise upon restoration of the complex to normal temperature. This procedure can be repeated as many times as desired by keeping the ternary complex between the successive information-wise exposures at very low temperatures. Finally all successive units of information can be permanently fixed by one of the methods described above.

When the information-wise exposed complex has been fixed to render further phototransformation of the non-exposed areas impossible, reading (scanning) of the recorded information can be repeated as often as desired. Reading consists in distinguishing a differentiation in absorption or in fluorescence emission characteristics.

Retrieval of the recorded information as a pattern of information wise differentiations in absorption or fluorescence emission can occur by means of appropriate filters.

In retrieving the recorded information it is possible to utilize the decrease in absorption intensity for the U.V.-blue region of the spectrum or the increase in absorption intensity for the red region of the spectrum on the exposed areas as compared with the non-exposed areas. For this purpose, filters can be used absorbing all light of the wavelength region not considered and preferably transmitting only light of the wavelength region considered.

However, retrieval of the recorded information is preferably based on the shift by the photoexposure of the absorption band or corresponding fluorescence emission band in the red region of the spectrum.

For this purpose, cut off filters can be used which transmit or absorb substantially all light of a wavelength below the red absorption band or fluorescence emission band of the exposed areas, or interference or band filters can be used which transmit or absorb substantially all light of the wavelength of the red absorption band or fluorescence emission band of the exposed areas only or unexposed areas only. In retrieving the recorded information it is also possible to use monochromatic coherent radiation sources, the radiation of which is absorbed only by the exposed or non-exposed areas.

According to an interesting embodiment of the present invention the recorded information is retrieved by utilizing the shift in fluorescence emission rather than the shift in absorption. For this purpose, after information-wise exposure of the complex and treatment thereof to render further phototransformation impossible, the complex is overall exposed to light of the absorption region of the complex e.g. U.V.-blue light which stimulates the fluorescence in the form of information-wise differentiations in fluorescence which can be retrieved as described above by means of an appropriate filter.

Since in the exposed areas, the intensity of absorption for the U.V.-blue region of the spectrum has decreased, the overall exposure of the information-wise exposed and fixed complex to U.V.-blue light will result in a higher excitation of the fluorescence emission in the non-exposed areas as compared with the exposed areas.

The recorded information can be read visually, scanned by means of an appropriate instrument or recorded by means of other photosensitive systems, e.g. silver halide photography.

The amount of detectable differentiation in absorption and fluorescence emission is proportional to the intensity of the exposure. This means that as the intensity of the exposure or the exposure time increases, the amount of transformed complex per unit of exposed area increases which results in an increased differentiation in absorption and fluorescence emission characteristics. However, exposure times as low as 1 millisecond by means of ordinary photographic flash units suffice for realizing a detectable change in absorption and fluorescence emission characteristics. When the exposure occurs by means of laser light exposure times of less than 1 millisecond suffice.

Since the amount of detectable differentiation in absorption or fluorescence emission characteristics is proportional to the intensity of the exposure it is possible by modulation of the exposure radiation to record data in analogon form. This ressembles quite well photographic image recording by means of silver halide elements and magnetic sound recording. As a matter of fact with audiomodulation of the exposure radiation the method of the present invention can be used for producing sound records. These records can then be reproduced through conventional electronic means including photocells, amplifiers, etc. The method of the present invention can thus be used in any process wherein use is made of a change in optical density to alter an electric signal, e.g., electronically recording and reproducing images and sound, recording and reproducing numerical data, etc.

The photoactive ternary complex described above which is preferably used according to the present invention can be obtained by the following steps: extraction of the protochlorophyll(ide)-apoprotein complex from etiolated (dark-grown) plants, more particularly from the leaves, buds, petioles, stem, branches, twigs and seeds of higher angiosperm plants, e.g., leguminous plants such as beans and peas and graminaceas such as barley and maize, homogenizing the plant material with a buffer solution, filtering the homogenate by squeezing through a fine-woven cloth and centrifuging the filtrate, admixing with the supernatant liquid natural or synthetic polymeric material thus causing the ternary complex to precipitate and collecting the precipitate by centrifuging.

The etiolated plant material from which the protochlorophyll(ide)-apoprotein complex should be extracted, is ground in a dark cold room in the presence of a buffer maintaining the pH between 7 and 10 and a compound protecting the protein against oxidation or denaturation e.g. glycerol, polyvinylpyrrolidone, triethanolamine and saccharose. The amount of buffer and protective agent used is such that the volume to be ground is kept as low as possible. Grinding may be done manually in a mortar or by means of a mechanical or electric grinder provided no active radiation is emitted by the mechanism and motors used.

The coarse debris is removed from the homogenate by filtering through a filter with large pores e.g. by squeezing through a cloth whereupon the filtrate is centrifuged e.g. for 30 to 60 minutes at speeds in the order of 5,000 to 30,000 G, or even more dependent on the viscosity of the medium. The supernatant liquid containing the photoactive protochlorophyll(ide)-apoprotein complex is collected and used to prepare the ternary complex.

The ternary complex of protochlorophyll(ide)-apoprotein with a polymeric material is formed by addition to the supernatant liquid of any polymeric material including a proteinaceous material that is capable of forming a precipitate with the protochlorophyll(ide)-apoprotein. The precipitate of so-called "ternary" complex is then collected by centrifugion.

All solutions and equipment used during the extraction of the binary complex and the formation of the ternary complex are kept at low temperature, say below 5° C. Whenever vision is necessary, a dim green safelight may be used during these operations as well as during etiolation.

The green safelight should be of low intensity and emit mainly radiation within the region of 500 to 600 nm, which does not cause phototransformation of the photoactive protochlorophyll(ide)-apoprotein complex having its main absorption in the U.V.-blue region (maximum at about 436 nm) and the red region (maximum at about 647 nm in the plant material and at 635–645 nm for the extracted binary complex as well as the ternary complex formed).

The ternary complex can be stored for several months in photoactive condition when kept at temperatures below 0° C., preferably below −10° C. e.g. at −15° C. However, at room temperature it loses its photoactivity after a day or two. As already noted above, the maintenance of long term photoactivity at room temperature is strictly dependent on the absence of free water in the photochlorophyll(ide)-apoprotein complex, and therefore, in order to remain photosensitive at room temperature, the ternary complex is dehydrated, e.g. by lyophilization.

Thus, for use in accordance with the present invention in order to record information the photosensitive ternary complex should be stored at temperatures below 0° C., and/or dehydrated.

For recording information the photosensitive ternary complex can be applied to a suitable transparent or opaque support material, e.g. a paper, glass, metal or synthetic film-forming support material. The photosensitive ternary complex may be lyophilized before or after application to the support. It can be applied as a single coating or as several coatings one above the other. The support material can be of any shape, especially sheets, dials, tapes, drums, tridimensional objects, etc.

Since for recording at ordinary temperature, the photosensitive ternary complex should in practice be protected against the harmful effect of moisture, the support material is preferably a water-impermeable film-forming plastic material e.g. cellulose esters such as cellulose triacetate, polyvinylacetate, polystyrene, polyethylene terephthalate and related resinous materials or an α-olefin coated paper e.g. paper coated with polyethylene or polypropylene. For the same purpose the coating of ternary complex is preferably overcoated, e.g. by spraying, with a protective water-impermeable coating of a hydrophobic polymeric material. Polymers that shield as much as possible the ternary complex from direct-contact with the atmosphere include polymers and copolymers of styrene, vinyl acetate, acrylonitrile, acrylic acid esters, methacrylic acid esters and butadiene, hydrophobic cellulose derivatives, phenoxy resins or polycondensates of the polyester type e.g. polycarbonates, etc.

The above hydrophobic protective coatings also protect the recorded information against deterioration owing to photooxidation. As a matter of fact, when not shielded against air oxidation, the permanently fixed information-wise exposed ternary complex should be stored in the dark.

It is evident that all materials used in the composition of photosensitive elements comprising the photosensitive complex should not effect distinguishing of the information-wise differentiation in fluorescence emission and absorption characteristics and therefore should preferably be colorless and non-fluorescent.

SPECIFIC EXAMPLES

Figure 1:
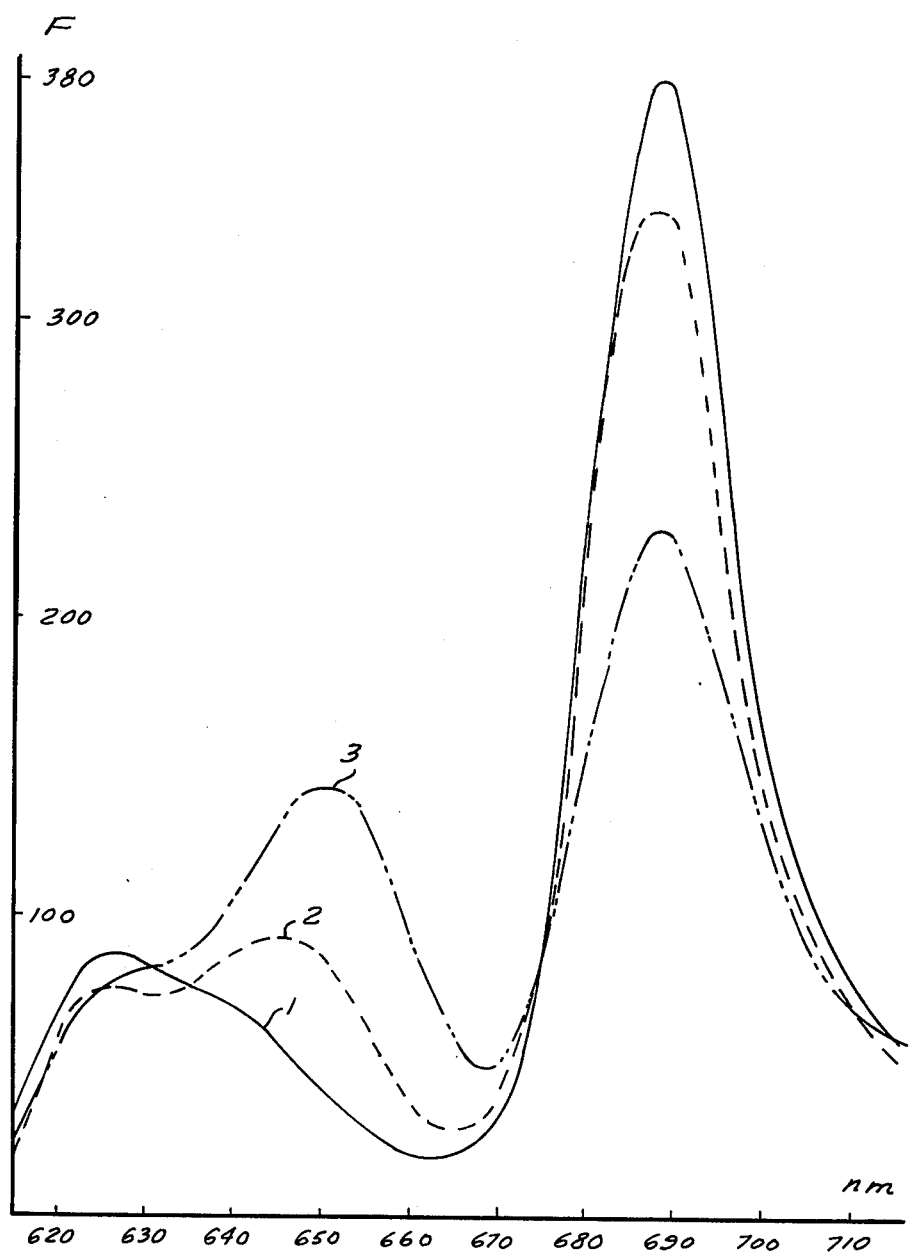
FIGS. 1 and 2 are spectral diagrams illustrating the examples of the invention.

The following Examples illustrate the present invention.

EXAMPLE 1

A copper plate was covered with ordinary filter paper onto which was placed a piece of 0.2 mm thick cardboard with a rectangular opening. The opening was filled uniformly with photosensitive ternary complex of protochlorophyll(ide)-apoprotein and polyethylene glycol, obtained as described in preparation 1 of the issued patent application mentioned above for "Photosensitive material of biological origin" thus forming a photosensitive coating of approximately 0.2 mm thickness.

The whole was lyophilized for 3 days at a temperature of −13° C. and a vacuum of 2 microns of mercury.

The layer of photosensitive ternary complex was exposed through a density wedge composed of areas with density 0.1, 0.5 and 1 respectively which was placed in contact with the photosensitive coating. Exposure occured by means of a Multiblitz 50 electronic polychromatic flash (1/700 sec. - 160 Ws) marketed by Gesellschaft fur Multiblitz-Gerate, Dr. Ing. Mannesmann, Porz-Westhoven, Germany, placed at a distance of 50 cm. from the photosensitive coating.

In order to avoid further phototransformation the exposed plate was placed in a Dewar flask in liquid nitrogen medium. Through a window of the Dewar flask, the exposed ternary complex was exposed to radiation from a mercury vapor lamp through a band filter with peak transmission at 442 nm, a bandwidth at half peak transmission from 442 nm to 472 nm and a bandwidth at 1/10 peak transmission from 416 to 490 nm. The fluorescence pattern formed by the exciting radiation was observed through an interference filter with peak transmission at 660 nm, a bandwidth at half peak transmission from 657 nm to 663 nm and a bandwidth at 1/10 peak transmission from 655 nm to 665 nm. The areas of the exposed coating corresponding with the density areas 1, 0.5 and 0.1 of the density wedge clearly show a proportional intensity of fluorescence emission. The area corresponding to the area of density 1 showing the most intense fluorescence emission and the area corresponding with the area of density 0.1 showing the least intense fluorescence emission.

When photographing the fluorescence pattern through the said interference filter by means of an ordinary camera loaded with a high speed silver halide film (exposure time: 2 min.) a direct-positive print of the density wedge was obtained.

EXAMPLE 2

Several lyophilized plates were made as described in Example 1 which were stored in light-tight metal boxes at −10° C in an atmosphere which was kept dry by means of calcium chloride.

Six plates were taken and exposed through the density wedge of Example 1 to an increasing number of flashes; the first plate, plate A received 1 flash as described in Example 1 and the 6th plate, plate F received 6 flashes. The intensity of exposure thus increases from 1 to 6 which simulates a modulation of the doses of illumination.

The exposed plates were placed in a Dewar flask as described in Example 1 and the fluorescence emission spectra of the three areas of the various exposed plates were recorded as described by C. Sironval et al., *Photosynthetica* 2 (4), 1968, 268-287 for etiolated leaf samples.

The spectra of plate A show that for the area corresponding with density 0.1 of the density wedge, the fluorescence emission maximum at 688 nm is higher than that of the area corresponding with density 0.5 of the density wedge, which in its turn is higher than that of the area corresponding with density 1 of the density wedge. This means that the fluorescence emission intensity at 688 nm is proportional to the exposure intensity and that there is a sufficient contrast between the area corresponding with density 0.1 and the area corresponding with density 1.

The spectra of the other plates which received an increasing number of flashes show the same phenomenon wherein the difference between fluorescence emission maxima of the areas corresponding to the different density areas of the density wedge decreases as the number of flashes increases. In FIG. 1 of the accompanying drawings the fluorescence emission spectra (relative fluorescence = F versus wavelength = nm) are given of plate E which was exposed to 5 flashes. Curves 1, 2 and 3 are the fluorescence emission spectra of the areas corresponding to the areas with density 0.1, 0.5 and 1 respectively of the density wedge. These spectraa show that even after 5 flashes the area corresponding with density 0.1 has the highest maximum at 688 nm and the lowest maximum at 647 nm whereas the area corresponding to density 1 has the lowest maximum at 688 nm and the highest maximum at 647 nm.

EXAMPLE 3

Example 2 was repeated with the difference that after exposure the plates were not placed in the Dewar flask but heated for 20 min. at 60° C to effect denaturation of the protein material.

Figure 2:
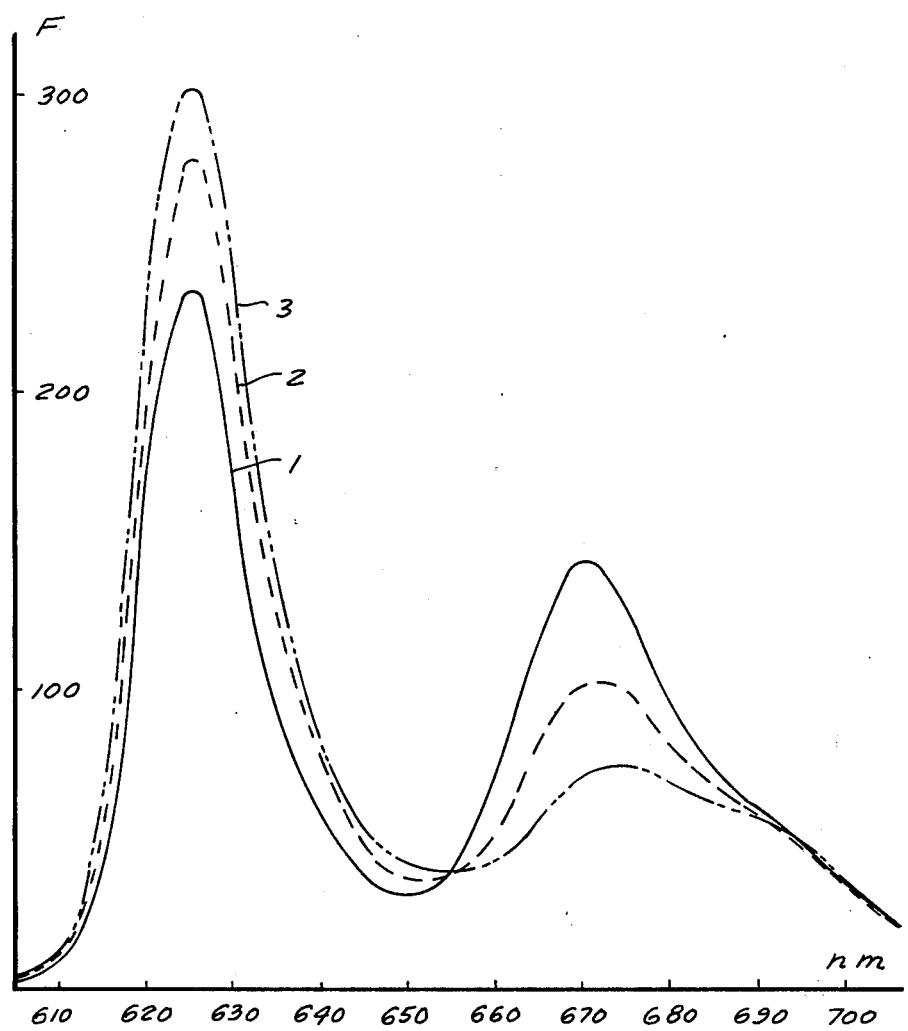

The fluorescence emission spectra of the various plates were recorded and showed the same phenomenon as described in Example 2 with the difference that the fluorescence emission maxima are at about 628 nm and about 670 nm. The areas corresponding with density 1 show the highest maximum at 628 nm and the lowest at 670 nm whereas the areas corresponding with density 0.1 show the highest maximum at 670 nm and the lowest at 628 nm. In FIG. 2 of the accompanying drawing the fluorescence emission spectra (relative fluorescence = F versus wavelength = nm) are given of plate E which was exposed to 5 flashes. Curves 1, 2, and 3 are the fluorescence emission spectra of the areas corresponding with density 0.1, 0.5 and 1 respectively.

EXAMPLE 4

To a cellulose triacetate support a coating of 1 mm of ternary complex, freshly prepared according to preparation 1 of the issued patent application mentioned above for "Photosensitive material of biological origin", was applied by means of a spatula.

The material was exposed at an ambient temperature of 0° C through an original placed in contact with the photosensitive material. Exposure occured for 1 second by means of a projection apparatus the lamp of which is situated at a distance of 1 meter from the original and photosensitive material. The projection apparatus used was fitted with a 24 V/250 W lamp and a lens with focus of 250 mm.

The exposed material showed image-wise differentiations in absorption in the red region of the spectrum the exposed areas having an absorption maxima at about 675 nm and the unexposed areas having an absorption maxima at about 640 nm.

The exposed material was placed in contact with a light-sensitive silver halide material and the latter material was exposed through the first material by means of a conventional enlarging apparatus, as used in silver halide photography, which was provided with an interference filter with peak transmission at 680 nm, a bandwidth at half peak transmission from 676 nm to 686 nm and a bandwidth at 1/10 peak transmission from 673 nm to 690 nm. The exposure light was thus fully absorbed by the exposed areas of the ternary complex but transmitted by the unexposed areas of the ternary complex so that the silver halide material was exposed at the areas corresponding to the non-exposed areas of the ternary complex.

After conventional development of the silver halide material, a positive print of the original was obtained.

We claim:

1. A method of recording and reproducing information comprising the steps of:
   providing a photosensitive layer of protochlorophyll-(ide)-apoprotein photoactive product upon a layer carrier; information-wise exposing said layer to light of a wavelength absorbed by said complex thereby forming a pattern of differentials in light-absorption and fluorescence emission characteristics representing the exposition pattern to record information;
   fixing said layer by denaturation of the protein of said photoactive product; and
   retrieving the recorded information from said layer by detecting a pattern of differences in intensity of light absorption of the layer;
   said photoactive product being formed by the steps of:
   extracting from an etiolated plant material a photoactive protochlorophyll(ide) apoprotein binary complex with a buffer solution at a pH between 7 and 10 in the presence of an agent to protect the apoprotein against denaturation at a temperature of at most 5° C;
   adding to said binary complex at a temperature of at most 5° C a natural or synthetic polymeric material selected from the group consisting of polyethylene glycol, polyvinylpyrrolidone, triethanolamine, saccharose and dextran to form a precipitate;
   cold-centrifuging said precipitate to form a product which is either in complex or in association with said polymeric material;
   lyophilizing said product at a temperature of at most 5° C so that the dried final product remains photoactive at room temperature; and
   providing said product in layer form suitable for recording.

2. The method defined in claim 1 wherein the information is retrieved by detecting a pattern of differences in intensity of light absorption of the layer in the untraviolet-blue region of the spectrum by intercepting light from said layer with a filter capable of absorbing substantially all light in the red region of the spectrum and of transmitting substantially all light of the ultraviolet-blue region of the spectrum.

3. The method defined in claim 1 wherein recorded information is retrieved by detecting a pattern of differentiation of light in the red region of the spectrum by passing light from said layer through a filter capable of passing substantially all light in the red region of the spectrum and intercepting all other wavelengths of light.

4. A method of recording and reproducing information comprising the steps of:
   providing a photosensitive layer of protochlorophyll-(ide)-apoprotein photoactive product upon a layer carrier; information-wise exposing said layer to light of a wavelength absorbed by said complex thereby forming a pattern of differentials in light-absorption and fluorescence emission characteristics representing the exposition pattern to record information;
   fixing said layer by denaturation of the protein of said photoactive product; and retrieving the recorded information from said layer by subjecting the layer to light and measuring fluorescence emission from said layer;

said photoactive product being formed by the steps of:

extracting from an etiolated plant material a photoactive protochlorophyll(ide) apoprotein binary complex with a buffer solution at a pH between 7 and 10 in the presence of an agent to protect the apoprotein against denaturation at a temperature of at most 5° C;

adding to said binary complex at a temperature of at most 5° C a natural or synthetic polymeric material selected from the group consisting of polyethylene glycol, polyvinylpyrrolidone, triethanolamine, saccharose and dextran to form a precipitate;

cold-centrifuging said precipitate to form a product which is either in complex or in association with said polymeric material;

lyophilizing said product at a temperature of at most 5° C so that the dried final product remains photoactive at room temperature; and providing said product in layer form suitable for recording.

5. The method defined in claim 4 wherein information is retrieved from said layer by subjecting it to light and measuring fluorescence emission from said layer in the red region of the spectrum.

6. The method defined in claim 4 wherein information is retrieved from said layer by sibjecting it to light of the ultraviolet-blue region of the spectrum and measuring fluorescence from said layer induced by light from said region.

7. A method of recording and reproducing information comprising the steps of:

providing a photosensitive layer of protochlorophyll-(ide)-apoprotein photoactive product upon a layer carrier;

informationwise exposing said layer to light of a wavelength absorbed by said complex thereby forming a pattern of differentials in light-absorption and fluorescence emission characteristics representing the exposition pattern to record information;

fixing said layer by subjecting said layer subsequent to recordal of information thereon to a temperature below $-100°$ C; and retrieving the recorded information from said layer by detecting a pattern of differences of intensity of light absorption of the layers;

said photoactive product being formed by the steps of:

extracting from an etiolated plant material a photoactive protochlorophyll(ide) apoprotein binary complex with a buffer solution at a pH between 7 and 10 in the presence of an agent to protect the apoprotein against denaturation at a temperature of at most 5° C;

adding to said binary complex at a temperature of at most 5° C a natural or synthetic polymeric material selected from the group consisting of polyethylene glycol, polyvinylpyrrolidone, triethanolamine, saccharose and dextran to form a precipitate;

cold-centrifuging said precipitate to form a product which is either in complex or in association with said polymeric material;

lyophilizing said product at a temperature of at most 5° C so that the dried final product remains photoactive at room temperature; and providing said product in layer form suitable for recording.

8. A method of recording and reproducing information comprising the steps of:

providing a photosensitive layer of protochlorophyll-(ide)-apoprotein photoactive product upon a layer carrier;

informationwise exposing said layer to light of a wavelength absorbed by said complex thereby forming a pattern of differentials in light-absorption and fluorescence emission characteristics representing the exposition pattern to record information;

fixing said layer by subjecting said layer subsequent to recordal of information thereon to a temperature below $-100°$ C; and retrieving the recorded information from said layer by subjecting the layer to light and measuring fluorescence emission from said layer;

said photoactive product being formed by the steps of:

extraction of an etiolated plant material a photoactive protochlorophyll(ide) apoprotein binary complex with a buffer solution at a pH between 7 and 10 in the presence of an agent to protect the apoprotein against denaturation at a temperature of at most 5° C;

adding to said binary complex at a temperature of at most 5° C a natural or synthetic polymeric material selected from the group consisting of polyethylene glycol, polyvinylpyrrolidone, triethanolamine, saccharose and dextran to form a precipitate;

cold-centrifuging said precipitate to form a product which is either in complex or in association with said polymeric material;

lyophilizing said product at a temperature of at most 5° C so that the dried final product remains photoactive at room tepmerature; and providing said product in layer form suitable for recording.

* * * * *